(12) United States Patent
Siddhamalli et al.

(10) Patent No.: US 8,865,825 B2
(45) Date of Patent: Oct. 21, 2014

(54) SEALABLE MATERIAL AND METHOD OF FORMING A DIELECTRIC WELD

(71) Applicants: Sridhar Krishnamurthi Siddhamalli, Lutz, FL (US); Mark W. Simon, Pascoag, RI (US); Michael E. Cahill, Waunakee, WI (US)

(72) Inventors: Sridhar Krishnamurthi Siddhamalli, Lutz, FL (US); Mark W. Simon, Pascoag, RI (US); Michael E. Cahill, Waunakee, WI (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 0 days.

(21) Appl. No.: 13/764,417

(22) Filed: Feb. 11, 2013

(65) Prior Publication Data

US 2013/0213569 A1 Aug. 22, 2013

Related U.S. Application Data

(62) Division of application No. 12/830,226, filed on Jul. 2, 2010, now Pat. No. 8,399,556.

(60) Provisional application No. 61/222,812, filed on Jul. 2, 2009.

(51) Int. Cl.
| | |
|---|---|
| *C08K 5/00* | (2006.01) |
| *B29C 65/00* | (2006.01) |
| *B32B 37/14* | (2006.01) |
| *B23K 35/36* | (2006.01) |
| *C08L 23/08* | (2006.01) |
| *C08L 31/04* | (2006.01) |
| *C08L 23/04* | (2006.01) |

(52) U.S. Cl.
CPC ............. *B32B 37/14* (2013.01); *C08L 31/04* (2013.01); *C08L 2205/02* (2013.01); *B23K 35/3613* (2013.01); *C08L 23/0853* (2013.01); *C08L 23/04* (2013.01)
USPC ........................................ 524/515; 156/275.5

(58) Field of Classification Search
CPC ....................................................... B32B 37/14
USPC ........................................ 524/515; 156/272.2
See application file for complete search history.

(56) References Cited

U.S. PATENT DOCUMENTS

| | | | |
|---|---|---|---|
| 4,505,421 A | 3/1985 | Gen et al. | |
| 5,274,035 A | 12/1993 | Chundury | |
| 5,313,034 A | 5/1994 | Grimm et al. | |
| 5,601,889 A * | 2/1997 | Chundury et al. | 428/34.3 |
| 6,162,865 A * | 12/2000 | Buehring et al. | 525/66 |
| 6,262,177 B1 | 7/2001 | Bergström et al. | |
| 6,558,809 B1 * | 5/2003 | Kelch et al. | 428/520 |
| 7,879,949 B2 * | 2/2011 | Chou | 525/221 |
| 2003/0040582 A1 * | 2/2003 | Braga et al. | 525/238 |
| 2006/0160952 A1 | 7/2006 | Chou et al. | |

FOREIGN PATENT DOCUMENTS

| | | | | |
|---|---|---|---|---|
| JP | H04202248 A | | 7/1992 | |
| JP | H0543770 A | | 2/1993 | |
| JP | 06287362 A | * | 10/1994 | ............. C08L 23/02 |
| JP | H06287362 A | | 10/1994 | |
| JP | 08048824 A | * | 2/1996 | ............. C08L 23/08 |
| JP | H0848824 A | | 2/1996 | |
| JP | 2001288312 A | | 10/2001 | |
| JP | 2003528960 A | | 9/2003 | |
| JP | 2005523376 A | | 8/2005 | |
| JP | 2009084326 A | | 4/2009 | |
| WO | 03095538 A1 | | 11/2003 | |

OTHER PUBLICATIONS

Translation of JP 08-048824, Feb. 20, 1996.*
Translation of Jp 06-287362, Oct. 11, 1994.*
International Search Report for PCT/US2010/040989 dated Feb. 11, 2011, 3 pgs.

* cited by examiner

*Primary Examiner* — Hui Chin
(74) *Attorney, Agent, or Firm* — Abel Law Group, LLP; Chi S. Kim

(57) ABSTRACT

A dielectric weldable material includes a blend of at least two components including an inert polymer and an elastomeric polar polymer. A method of forming a bond includes providing a substrate having a first end and a second end, wherein the substrate includes a blend of at least two components including an inert polymer and an elastomeric polar polymer. The method further includes bonding the first end and second end of the substrate with high frequency electromagnetic energy.

18 Claims, No Drawings

SEALABLE MATERIAL AND METHOD OF FORMING A DIELECTRIC WELD

CROSS REFERENCE TO RELATED APPLICATION(S)

The present application is a divisional application of U.S. patent application Ser. No. 12/830,226, filed Jul. 2, 2010, entitled "SEALABLE MATERIAL AND METHOD OF FORMING A DIELECTRIC WELD," naming inventors Sridhar Krishnamurthi Siddhamalli, Mark W. Simon, and Michael E. Cahill, which claims priority from U.S. Provisional Patent Application No. 61/222,812, filed Jul. 2, 2009, entitled "SEALABLE MATERIAL AND METHOD OF FORMING A DIELECTRIC WELD," naming inventors Sridhar Krishnamurthi Siddhamalli, Mark W. Simon and Michael E. Cahill, which application is incorporated by reference herein in its entirety.

FIELD OF THE DISCLOSURE

This disclosure, in general, relates to dielectric weldable materials and methods of forming a high frequency bond.

BACKGROUND

Heat seals are used for a variety of applications for numerous industries. Typically, a polymeric material is heated to produce a seal between two portions of an article for a period of time until an appropriate seal is achieved. Unfortunately, the thermal process is timely. For instance, the process to seal a polymeric material includes heating the article and cooling the article to complete the cycle, which can take several minutes. This period of time is too lengthy on a manufacturing scale for efficient commercialization.

To reduce the sealing time, a dielectric welding technique is used. The dielectric welding technique, also known as high frequency or radiofrequency welding, uses both high frequency electromagnetic energy and pressure to create a seal. The dielectric welding technique takes a fraction of the time compared to thermal welding; however, dielectric welding can only be applied to particular polymers. Polyvinylchloride (PVC), functionalized polyolefins including ethylene copolymers or terpolymers of vinyl acetate or acrylic or methacrylic acids or esters or their derivatives, and thermoplastic polyurethane (TPU) are commonly used thermoplastic polymers conducive to dielectric welding. These particular polymers are conducive to dielectric welding due to their high dielectric loss factor (i.e. greater than 0.1) or dissipation factor tangent delta of the polymeric material. Unfortunately, these polymers may not have physical or mechanical properties desired for certain applications.

Polymers that may be desired typically include those that are flexible, transparent, and appropriate for certain applications. Unfortunately, many of these polymers can only be sealed thermally due to their inert nature, i.e. their low dissipation factor, and they cannot be sealed with dielectric energy. As a result, manufacturers are often left to choose the physical and mechanical properties they desire without an option as to whether it can be sealed quickly with dielectric energy.

As such, an improved polymeric material that can be sealed with dielectric welding is desired.

SUMMARY

In a particular embodiment, a dielectric weldable material includes a blend of at least two components including an inert polymer and an elastomeric polar polymer.

In another exemplary embodiment, a method of forming a bond includes providing a substrate having a first end and a second end, wherein the substrate includes a blend of at least two components including an inert polymer and an elastomeric polar polymer. The method further includes bonding the first end and second end of the substrate with high frequency electromagnetic energy.

DETAILED DESCRIPTION

In a particular embodiment, a dielectric weldable material includes a blend of at least two components that includes an inert polymer and an elastomeric polar polymer. The blend of the inert polymer with the elastomeric polar polymer advantageously provides a material that can be sealed or welded with dielectric welding. In an example, dielectric welding includes high frequency electromagnetic energy (HF) and radiofrequency energy (RF).

Typically, the inert polymer is a polymer that is inactive when high frequency energy is applied to the material. Inert polymers are typically HF and RF inactive because of their unfavorable dielectric properties. HF and RF activity is related to the dielectric constant or loss factor or dissipation factor tangent delta of a polymer material or compound. Typically, if the dielectric loss constant of a polymer is greater than 0.10, the polymer is weldable with dielectric energy. If a polymer or compound or resin or material is inert (i.e., a dielectric loss constant less than 0.10), its dissipation factor is low. Modifying the inert polymer with the elastomeric polar polymers favorably changes the dielectric properties of the inert polymer and thus, the HF and RF behavior of the inert polymer. Typically, the inert polymer has a dielectric loss factor of less than about 0.10, such as less than about 0.08, such as less than about 0.07, such as less than about 0.06, or even less than about 0.05 prior to the addition of the elastomeric polar polymer. Any inert polymer having a dielectric loss factor of less than about 0.10 prior to the addition of the elastomeric polar polymer may be envisioned.

Exemplary inert polymers may include thermoplastic elastomers such as thermoplastic olefin based elastomers and thermoplastic polyester based elastomers; thermoplastic vulcanizates; thermosets; blends thereof, mixtures thereof, and the like. In an embodiment, the inert polymers are polyolefins. In a further embodiment, the inert polymers include any styrene based block copolymers such as styrene-butadiene, styrene-isoprene, blends thereof, mixtures thereof, and the like. In an embodiment, the inert polymer is a mixture of a polyolefin and a thermoplastic elastomer. In an embodiment, the inert polymer is animal derived component free (ADCF).

In a particular embodiment, the inert polymer is a polyolefin. A typical polyolefin may include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. In a particular example, the polyolefin includes polyethylene, such as low density polyethylene. In another example, the polyolefin includes polypropylene. The polyolefin further includes olefin-based random copolymers, olefin-based impact copolymers, olefin-based block copolymers, olefin-based specialty elastomers, olefin-base specialty plastomers, blends thereof, mixture thereof, and the like. In an example, the inert polymer is a blend or coextrusion of polypropylene with styrene-ethylene/butylene-styrene (SEBS). Commercially available examples of polyolefins include polyethylene, polyethylene based elastomers such as Engage™ available from Dow Chemical Co. and polypropylene, polypropylene based elastomers such as Versify™ available from Dow Chemical Co., Vistamaxx™ available from Exxon Mobil Chemical, and the like.

In an embodiment, the inert polymer can be a polyolefin of any kind, thermoplastic elastomer, or mixtures of both as described above. In an exemplary embodiment, the inert polymer is a styrenic TPE based system that is suitably modified with polyolefin and additionally the inert polymer system contains an appropriate plasticizer. The plasticizer is application specific and can be, for example, a USP Class VI compliant mineral oil whose composition is defined by paraffinic, naphthenic and aromatic fractional contents. Because the oil plays an important role during plasticizing the elastomeric polar component of the final blend, the formulation of the inert polymer is chosen to impart the desired properties. The inert polymer recipe typically serves the purpose of balancing the hardness of the final resultant blend as well as delivering the right amount of oil to the final blend and not trigger off problems such as migration and bleeding. Furthermore, oil is useful as a lubricant for tubing, which is desired for weldability and sealability characteristics.

The elastomeric polar polymer is a component of the blend. In an embodiment, the elastomeric polar polymer may or may not have crystallinity. In an embodiment, the elastomeric polar polymer is an amorphous polar polymer. "Amorphous" as used herein refers to a polymer that is substantially non-crystalline, i.e. with no crystalline melting point. In an embodiment, the elastomeric polar polymer is semi-crystalline, i.e. with a crystalline DSC melting point and Vicat softening point of up to about 100° C., a density of below 0.96 g/cc and Shore hardness of below 95 A. (For example, amorphous EVA with no crystallinity such as Levamelt 700 has a density of 1.08 g/cc)

Any elastomeric polar polymers are envisioned. An exemplary elastomeric polar polymer is ethylene vinyl acetate. The amount of vinyl acetate found in the ethylene vinyl acetate polymer determines the crystallinity of the polymer. In particular, the higher the percentage of vinyl acetate in the EVA copolymer, the more the crystalline regularity of the ethylene chain is disturbed or destroyed. Crystallization is progressively hindered and is substantially absent with an EVA copolymer containing about 50% vinyl acetate, rendering an amorphous polymer. In an embodiment, the ethylene vinyl acetate of the present disclosure has a vinyl acetate content of greater than about 50% by weight of the total weight of the ethylene vinyl acetate. For instance, the ethylene vinyl acetate has a vinyl acetate content of greater than about 60% by weight to about 80% by weight of the total weight of the ethylene vinyl acetate, such as about 60% by weight to about 70% by weight of the total weight of the ethylene vinyl acetate. Further, the glass transition temperature, Tg, is typically low for the amorphous polymer, i.e. less than about 0° C. In an embodiment, the glass transition temperature for amorphous ethylene vinyl acetate is less than about 0° C., such as less than about −15° C., or even less than about −25° C.

In an embodiment, the ethylene vinyl acetate has a number average molecular weight (Mn) of about 70,000 to about 90,000, such as about 80,000 to about 85,000. The ethylene vinyl acetate may have a weight average molecular weight (Mw) of about 250,000 to about 400,000, such as about 280,000 to about 350,000. In an embodiment, the ethylene vinyl acetate has a poly dispersity index (Mw/Mn) of about 3.0 to about 5.0, such as about 3.5 to about 4.0. In an embodiment, the ethylene vinyl acetate has a desirable melt flow index (MI), such as about 1 to about 7, such as about 1.5 to about 6, at a testing parameter of 190° C./21.1N. Generally, the melt viscosity at 200° C. with a 100 l/s shear rate may be up to about 600 Pa·s, such as about 400 Pa·s to about 500 Pa·s. With a 1000 l/s shear rate, the melt viscosity may be up to about 300 Pa·s, such as about 100 Pa·s to about 200 Pa·s. In an embodiment, the solution viscosity is up to about 2000 mPa·s, such as about 200 mPa·s to 1500 mPa·s at a 15% concentration in toluene, or up to about 50,000 mPa·s, such as about 7000 mPa·s to 30,000 mPa·s at a 30% concentration in toluene.

In an exemplary embodiment, the elastomeric polar polymer has a desirable shore A hardness, such as about 30 to about 40. In an embodiment, the elastomeric polar polymer may have a shore A hardness of more than 40.

Typically, amorphous ethylene vinyl acetate is synthesized by solution polymerization at a pressure of about 200 bar to about 1000 bar and a temperature of about 50° C. to about 120° C. In an embodiment, the amorphous ethylene vinyl acetate may be synthesized by emulsion polymerization conducted at about 1 bar to about 200 bar pressure and temperature of 30-70° C. In contrast, crystalline ethylene vinyl acetate is prepared by mass polymerization at a pressure of about 1000 bar to about 3000 bar at a temperature of about 150° C. to about 350° C.

In an embodiment, an elastomeric ethylene vinyl acetate is used that has a low vinyl acetate content. "Low vinyl acetate content" as used herein refers to an ethylene vinyl acetate that contains a vinyl acetate content of less than about 35%. In a particular embodiment, the ethylene vinyl acetate has a vinyl content of less than about 30%, such as between about 7% to about 25%, such as between about 10% to about 20%, or even between about 15% to about 20%. The use of a low vinyl acetate content ethylene vinyl acetate provides a blend that has desirable optical appearance. For instance, the use of the low vinyl acetate content ethylene vinyl acetate provides a blend with optical clarity compared to an ethylene vinyl acetate with a vinyl acetate content greater than 35%. In an embodiment, ethylene vinyl acetate polymers containing less than 20% vinyl acetate may improve clarity in particular applications. The low vinyl acetate content ethylene vinyl acetate may be semi-crystalline. An example of elastomeric semi crystalline polar polymer is EVA containing not greater than about 35% vinyl acetate.

In an example, the blend includes the elastomeric polar polymer present at a range of about 1% by weight to about 99% by weight of the total weight of the polymeric blend. In an embodiment, the elastomeric polar polymer is present at greater than at least about 5% by weight of the total weight of the polymeric blend, such as greater than about least about 15% by weight of the total weight of the polymeric blend. In a particular embodiment, the elastomeric polar polymer is present at greater than about least about 10% by weight of the total weight of the polymeric blend, such as a range of about 10% by weight to about 40% by weight of the total weight of the polymeric blend, or even a range of about 15% by weight to about 30% by weight of the total weight of the polymeric blend. Typically, the level of the elastomeric polar polymer present in the blend may be optimized based on the final properties desired.

In an exemplary embodiment, the blend further includes any additive envisioned such as a crosslinking agent, a photoinitiator, a filler, a plasticizer, an antioxidant, or any combination thereof. Exemplary antioxidants include phenolic antioxidants. Exemplary fillers include calcium carbonate, talc, radio-opaque fillers such as barium sulfate, bismuth oxychloride, any combinations thereof, and the like. Exemplary crosslinking agents include peroxides, cyanurates, combinations thereof, and the like. Exemplary plasticizers include any known plasticizers such as oils and the like. In a particular embodiment, a plasticizer is used when a low vinyl acetate ethylene vinyl acetate is included in the blend. The plasticizer further improves the clarity of the blend, the processability of the blend, and reduces tackiness of the blend. Alternatively, the blend may be free of crosslinking agents, photoinitiators, fillers, plasticizers, and antioxidants.

Typically, an additive may be present at an amount of not greater than about 50% by weight of the total weight of the polymeric blend, such as not greater than about 40% by weight of the total weight of the polymeric blend, or even not greater than about 30% by weight of the total weight of the polymeric blend.

The components of the blend may be melt processed by any known method to form a blend. In an embodiment, the inert polymer and elastomeric polar polymer may be melt processed by dry blending or compounding. The dry blend may be in powder, granular, or pellet form. Examples of compounding include continuous twin screw process or batch related Banbury process. In an embodiment, the blend can be extruded or injection molded. In a particular embodiment, the blend can be melt processed by any method envisioned known in the art such as laminating, casting, molding, and the like. In a particular embodiment, a plasticizer, such as an oil, may be blended with the inert polymer and subsequently, the inert polymer/oil blend may be blended with an ethylene vinyl acetate polymer containing a low vinyl acetate content.

In an exemplary embodiment, the components of the polymeric blend may be cured through cross-linking. In a particular example, the blend may be cross-linkable through radiation, such as using X-ray radiation, gamma radiation, ultraviolet electromagnetic radiation, visible light radiation, electron beam (e-beam) radiation, or any combination thereof. Ultraviolet (UV) radiation may include radiation at a wavelength or a plurality of wavelengths in the range of from 170 nm to 400 nm, such as in the range of 170 nm to 220 nm. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator, an electron-accelerator, or an x-ray.

The polymeric blends may or may not be sterilized. In an embodiment, the polymeric blend is sterilized by any method envisioned. For instance, the polymeric blend may be sterilized before or after dielectric welding. Exemplary sterilization methods include steam, gamma, ethylene oxide, E-beam techniques, combinations thereof, and the like. In a particular embodiment, the polymeric blend is sterilized by gamma radiation.

The addition of the elastomeric polar polymer imparts polarity to change the dielectric properties of the inert polymer such that it is weldable with dielectric energy, i.e. high frequency (HF) or radiofrequency (RF) energy. Notably, "welding" and "sealing" can be used interchangeably and refers to welding two portions of an article formed of the polymeric blend together. Further, welding includes flat seals as well as circumferential seals for tubing applications. Electromagnetic energy is typically applied with parameters sufficient to yield a seal that withstands a seal integrity pressure test of about 30 psi air pressure for 10 minutes under dry and wet conditions. Typical parameters for dielectric welding include, for example, electromagnetic energy at a frequency of about 26 MHz to about 28 MHz, such as about 27 MHz. In an exemplary embodiment, the electromagnetic energy is applied for a time period of about 10 seconds to about 60 seconds. Typically, the power level is about 200 Watts. Further, pressure is typically applied at the site of the seal, for example, at about 80 psi. Any reasonable parameters for dielectric welding can be envisioned. Any other welding/sealing methods can be envisioned, for example, welding by heat, vibration, ultrasonic, infrared, combinations thereof, and the like.

Particular embodiments of the above-described method of dielectric welding provide technical advantages over heat welding techniques. While reducing the time period of heat welding, the present embodiments also can produce low toxicity articles having desirable mechanical properties. In particular, the resulting blends have desirable flexibility, substantial clarity or translucency, desirable glass transition temperatures, desirable low temperature performance, and chemical resistance to oils and alcohols.

In embodiment, the resulting blend may have further desirable physical and mechanical properties. For instance, the blend of the inert polymer and elastomeric polar polymer may advantageously produce low durometer silicone elastomers. For example, a blend having a Shore A durometer not greater than 70, such as not greater than 65, such as not greater than 60, and having desirable mechanical properties may be formed. Such properties are indicative of a flexible material.

In addition to desirable hardness, the polymeric blends have advantageous physical properties, such as desirable elongation-at-break, tensile strength, or tear strength. Elongation-at-break and tensile strength are determined using an Instron instrument in accordance with ASTM D-412 testing methods. For example, the polymeric blends may exhibit an elongation-at-break of at least about 600%, such as at least about 700%, or even at least about 750%. In an embodiment, the tensile strength of the polymeric blend is greater than about 500 psi, and in particular, is at least about 600 psi, such as at least about 900 psi, or even at least about 1000 psi. Particular embodiments exhibit a desirable combination of elongation and tensile strength, such as exhibiting a tensile strength of at least about 600 psi and an elongation of at least about 700%. In an embodiment, the polymeric blend exhibits a desirable combination of elongation and tensile strength, such as exhibiting a tensile strength of at least about 1000 psi and an elongation of at least about 700%. Further, the polymeric blend may have a tear strength of greater than about 200 pli, as measured by ASTM D624.

Applications for the polymeric blend are numerous. In particular, the non-toxic nature of the polymeric blend makes the material useful for any application where toxicity is undesired. For instance, the polymeric blend has potential for FDA, USP, and other regulatory approvals. In an exemplary embodiment, the polymeric blend may be used in applications such as industrial, medical, biopharma, food & beverage, and the like. In an embodiment, the polymeric blend may be used a single layer article, a multi-layer article, or can be laminated, coated, or formed on a substrate. Multi-layer articles may include layers such as reinforcing layers, adhesive layers, barrier layers, chemically resistant layers, metal layers, any combination thereof, and the like. The blend can be formed into any useful shape such as film, sheet, tubing, and the like. In an embodiment, the blend can be used for medical bags containing medical liquids, for instance, for blood bags. In an exemplary embodiment, the blend can be used to form a medical bag as well as any corresponding tubing. The polymeric blend may adhere or bond to other substrates. In an embodiment, the polymeric blend may bond or adhere to polycarbonate, polyethylene, and/or silicone substrate. In a particular embodiment, the polymeric blend may bond or adhere to polycarbonate, polyethylene, and/or silicone tubing in an overmolding (injection molding process) application.

In a particular embodiment, the polymeric blend may be used to produce tubing and hoses. For instance, the polymeric blend can be used as tubing or hosing to produce low toxicity pump tubing, reinforced hosing, chemically resistant hosing, braided hosing, and low permeability hosing and tubing. For instance, tubing may be provided that has any useful diameter size for the particular application chosen. In an embodiment, the tubing may have a outside diameter (OD) of up to about 2.0 inches, such as about 0.25 inch, 0.50 inch, and 1.0 inch. Tubing of the polymeric blend advantageously exhibits desired properties such as chemical stability and increased lifetime. For example, the tube may have a life greater than about 10 hours as a peristaltic pump tube, such as greater than about 15 hours, or even greater.

EXAMPLES

Example 1

Model C-Flex used in the study was R70-374 TPE compound. In general terms, R70-374 is a melt compounded material of S-EB-S styrenic TPE resin, polypropylene (PP) and mineral oil obtained from Saint-Gobain.

To show that the ethylene vinyl acetate (EVA) polymeric additive works both ways following two process trials are undertaken:

Tubing samples of size 0.25"×0.38" are obtained by making, at the feed hopper of the single screw melt extruder, dry blends (salt/pepper type) of R70-374 with such varying percentages of amorphous EVA (about 70% VA) as 15, 20, 25 and 30% by weight. The amorphous EVA has a weight average molecular weight (Mw) of about 300,000, a number average molecular weight (Mn) of about 80,000, and a poly dispersity index (Mw/Mn) of about 3.9. The amorphous EVA has a melt flow index of about 2-6 tested at 190° C./21.1N, a solution viscosity of about 200 mPa·s to about 1500 mPa·s at a 15% concentration in toluene, and a melt viscosity of about 400 Pa·s to about 500 Pa·s with a shear rate of 100 l/s at 200° C. This technique enables the salt/pepper blending of any thermoplastic or thermosetting polymer that is not inherently RF absorptive to be rendered RF receptive and thus heat sealable by RF technique by simply blending the said polymer with an amorphous elastomeric polar polymer.

Parameters for an Akron 2.5 inch Single Screw Extrusion Process can be seen in Table 1.

TABLE 1

| | |
|---|---|
| Melt pressure | 790 psi |
| Screw Speed | 38 RPM |
| Temperature profile | 320° F., 330, 340, 350, 360, 360 and 360° F. corresponding to the zones of 1, 2, 3 and 4 for the barrel, 1, 2, 3 for the die section |
| Motor Load | 18 Amperes |

The following recipe in Table 2 is pre-mixed in a ribbon blender and the mix is then melt compounded in a twin screw extruder. Parameters for Berstorff ZE40 Twin Screw Compounding Process set in Table 3. The pellets thus obtained are then fed into a hopper of a single screw extruder to extrude tubing of ¼×⅜ inch size. This technique offers the advantage of having all the ingredients mixed at one step before proceeding to extrusion of the tube should salt/pepper or dry blending not be desired.

TABLE 2

| Material | Percentage of Total Weight |
|---|---|
| Kraton G1651H | 25.9% |
| Polypropylene | 16.0% |
| Mineral Oil | 28.0% |
| EVA (about 70% VA content) | 30.0% |
| Irganox 1010 | 0.1% |

TABLE 3

| | |
|---|---|
| Screw Speed | 225 RPM |
| Motor Load | 38 Amperes |
| Feed Rate | 52 pounds per hour |
| Temperature Profile | 180° C. for all the zones except the die for Gala underwater palletizing unit that is set at 170° C. |
| Melt Temperature | 236° C. |
| Melt Pressure | 300 psi |

The dry blended pellets obtained from the single screw melt extruder and compounded pellets from the twin screw extruder are also injection molded (parameters for the Injection Molding Process on a Van Dorn machine can be seen in Table 4) into plaques to test for various physical properties as seen in Table 5.

TABLE 4

| | |
|---|---|
| Temperature profile | Flat at 400° F. for the nozzle, front, center and rear zones |
| Injection pressure | 1500 psi |
| Hold pressure | 500 psi |
| Back pressure | 200 psi |
| Injection speed | 60% |
| Injection time | 4 seconds |
| Cooling time | 25 seconds |

TABLE 5

| | C-Flex R70-374 Control | R70-374 + Varying Levels of EVA (about 70% VA) Dry Blended | | | | Melt Twin Screw Compounded RF Recipe |
|---|---|---|---|---|---|---|
| | | 15% EVA | 20% EVA | 25% EVA | 30% EVA | 30% EVA |
| Shore A Hardness ASTM D2240 | 62 | 55 | 54 | 56 | 58 | 62 |
| Tensile Strength at Break, psi ASTM D412 | 970 | 615 | 620 | 585 | 620 | 1035 |
| Ultimate Elongation, % ASTM D412 | 755 | 760 | 755 | 730 | 775 | 715 |
| Compression Set, % 22 hours, 70° C. ASTM D | 57 | | | | | 47 |
| Peristaltic Pump Life Hours Size 17 L/S Cole-Parmer Standard Head | 6 | | | | | 15 |
| Tensile Strength, psi at 100%/300% ASTM D412 | 230/380 | | | | | 330/464 |

TABLE 5-continued

| | C-Flex R70-374 Control | R70-374 + Varying Levels of EVA (about 70% VA) Dry Blended | | | | Melt Twin Screw Compounded RF Recipe |
|---|---|---|---|---|---|---|
| | | 15% EVA | 20% EVA | 25% EVA | 30% EVA | 30% EVA |
| Graves Tear Strength, pli ASTM D624, Die C | 175 | | | | | 210 |
| Brittleness Point, ° C. ASTM D746 | −66 | | | | | −48 |
| Water Absorption, % ASTM D570 | 0 | | | | | 0 |
| Extraction in Isopropanol, IPA, % at Room Temp. and for 3 hours Northboro R&D Test | 8.7 | | NOT TESTED | | | 4.7 |
| Extraction in Isopropanol, IPA, % at Room Temp. and for 3 hours Northboro R&D Test - gamma sterilized | 10.3 | | | | | 2.3 |
| RF Sealing Sebra Test Method | NO | YES | YES | YES | YES | YES |

*The data presented above are on un-sterilized specimens unless otherwise indicated.

The blended samples have advantageous results compared to the control sample. The blended samples maintain flexibility with a shore A durometer of less than about 62. Notably, the blended sample with 30% EVA has an almost 50% decrease in extractables for the un-sterilized sample and an almost 80% decrease in extractables for the sterilized sample compared to the control, as seen in the extraction in Isopropanol.

The six tubing samples are tested for quality and integrity. The control sample is thermally sealed at a temperature of about 160° C. for a dwell time of 40 seconds, a cool temperature of about 50° C., a cool time of 60 seconds, and air at 80 psi. RF welding cannot seal the control sample. The fives samples are reactive to RF welding at an RF dwell time for 6.0 seconds, a clamp time of 15.0 seconds, and air at 80 psi. The power of the RF equipment used is 200 W and the pressure applied on the specimen during sealing is 80 psi. Typically RF equipment works at about 27 MHz. Detailed results can be seen in Table 6.

TABLE 6

| Sample | Tubing Conditions | Successfully Sealed | Average Seal Time | Visual Inspection | Seal Integrity Pressure Test |
|---|---|---|---|---|---|
| Control | Dry tubing | Yes | 2.02 | Pass | Pass |
| | Saline filled tubing | NA | NA | NA | NA |
| RF70 374 + 15% EVA Dry blended | Dry tubing | Yes | 0.33 | Pass | Pass |
| | Saline filled tubing | Yes | 0.33 | Pass | NA |
| RF70 374 + 20% EVA Dry blended | Dry tubing | Yes | 0.33 | Pass | Pass |
| | Saline filled tubing | Yes | 0.33 | Pass | NA |
| RF70 374 + 25% EVA Dry blended | Dry tubing | Yes | 0.33 | Pass | Pass |
| | Saline filled tubing | Yes | 0.33 | Pass | NA |
| RF70 374 + 30% EVA Dry blended | Dry tubing | Yes | 0.33 | Pass | Pass |
| | Saline filled tubing | Yes | 0.33 | Pass | NA |
| RF70 374 + 30% EVA Twin Screw Compounded | Dry tubing | Yes | 0.33 | Pass | Pass |
| | Saline filled tubing | Yes | 0.33 | Pass | NA |

All five samples that were sealed with RF were sealed successfully. They all passed visual inspection and a seal integrity pressure test at 30 psi air pressure for 10 minutes.

Example 2

In an initial round of recipes, SS09-084 following recipes are compounded and tube extruded.

SS09-084, #5: 50% C-Flex R70-046-000 and 50% Ultrathene UE624000 (Additive free EVA polymer containing 18% VA supplied by Lyondell).

C-Flex-046 resin has a nominal Shore hardness of 35 A. The resultant oil in the final compound is about 23.2%. This recipe is successfully twin screw compounded and the pellets thus obtained are tube extruded in to ⅛×¼ and ⅜ clear tubing.

SS09-084, #4: 35% C-Flex R70-251-000 and 65% Ultrathene UE624000 (Additive free EVA polymer containing 18% VA supplied by Lyondell).

C-Flex-251 resin has a nominal Shore hardness of 5 A. This recipe is twin screw compounded with no issues. However, tube extrusion posed issues as only ⅛×¼ tubing is successfully obtained. Bigger sizes such as ⅜×⅝ flatten out. The resultant oil in the recipe is about 24.6%. Additionally the ⅛×¼ tubing after a few days starts to exhibit oil bleed-out thus indicating oil incompatibility.

The above formulation work indicated that oil tolerance in EVA is sensitive and that there is a significant difference in tube processability and oil compatibility behaviors even though the oil content changed only from 23.2% to 24.6%.

Example 3

10 recipes are compounded and tested for Shore A, tensile and optical properties. The sample IDs are SS 10-002 #1 through #10. As can be seen from the tabulated data below that SS10-002 #1 and #2 meet the general requirements of ~60-70 A, clear flexible tubing having potential for RF reactivity. Evatane are semi crystalline EVA copolymers and the grades 33-15 and 28-03 contain approximately 33% and 28% VA content respectively. Levamelt 700 is elastomeric EVA containing 70% VA. Ultrathene EVA UE624000 is semicrystalline EVA with 18% VA content. The optical clarity is characterized by light transmission data in the visible wavelength range of 400-700 nm as plotted below. It is an interesting result that 18% VA containing EVA based C-Flex blend produced relatively more clarity than other types of EVA copolymers. The above 10 recipes are detailed below in Table 7 with their properties seen in Table 8.

TABLE 7

| SS10-004 | R70-046 | Ultrathene EVA UE624000 | Levamelt 700 | Evatane 28-03 | R70-374 | Evatane 33-15 |
|---|---|---|---|---|---|---|
| #1 | 50% | 50% | | | | |
| #2 | 60% | 40% | | | | |
| #3 | 50% | 40% | 10% | | | |
| #4 | 50% | 30% | 20% | | | |
| #5 | 50% | | | 50% | | |
| #6 | 60% | | | 40% | | |
| #7 | 50% | | 10% | 40% | | |
| #8 | 50% | | 20% | 30% | | |
| #9 | | | | 30% | 70% | |
| #10 | | | | | 50% | 50% |
| #11 | | | | | 100% | |

TABLE 8

| SS10-004 | Sample Name | Shore A 15 s | | Ten. Mod., psi | | Break Str. psi | Ult. Elong. % | Std. Dev. | Optical Appearance |
|---|---|---|---|---|---|---|---|---|---|
| | | Peak | Delay | 100% | 300% | | | | |
| 1 | SS10-002 | 66 | 67 | 445 | 705 | 1165 | 630 | 1.6 | Clear |
| 2 | SS10-002 | 64 | 62 | 365 | 600 | 975 | 605 | 0.5 | Clear |
| 3 | SS10-002 | 72 | 67 | 360 | 570 | 945 | 625 | 0.6 | Translucent |
| 4 | SS10-002 | 61 | 56 | 290 | 485 | 875 | 675 | 0.5 | Translucent |
| 5 | SS10-002 | 63 | 59 | 285 | 450 | 920 | 710 | 0.5 | Translucent |
| 6 | SS10-002 | 63 | 59 | 290 | 495 | 865 | 680 | 1.6 | Translucent |
| 7 | SS10-002 | 61 | 57 | 270 | 455 | 860 | 685 | 0.5 | Translucent |
| 8 | SS10-002 | 60 | 54 | 225 | 375 | 745 | 705 | 0.6 | Translucent |
| 9 | SS10-002 | 54 | 49 | 220 | 355 | 655 | 740 | 1.0 | Translucent |
| 10 | SS10-002 | 64 | 59 | 285 | 400 | 475 | 645 | 0.6 | Translucent |
| 11 | R70-374-000 | 64 | 57 | 265 | 440 | 875 | 745 | 2.1 | Clear |

Both the formulas #1 and #2 of SS 10-004 that are based on a 50/50 and 60/40 blend of C-Flex-046/Ultrathene EVA respectively have Shore hardness of below 70 A and tensile strength values greater than that of RF inactive and control formulation of C-Flex-3747.

Because the SS10-004, #1 formula had already been produced and tube extruded (⅜×⅝) using CWTR production equipment (SS09-084, #5) and RF seal tested, SS 10-004, #2 formula is compounded and tube extruded in ⅜×⅝ size at CWTR under SS10-005 ID. This tubing is also RF seal tested. In both cases both pre-gamma and post-gamma (40-50 kGy of dose) irradiated versions of the tubing are tested.

Results for RF sealing and testing of tubing are embedded below. SS09-084, #5 recipe has evidently been found to be more efficiently and reliably RF reactive than SS 10-005. Thus optimum level of percent EVA (Ultrathene, 18% VA) in the recipe is found to be about 50%.

TABLE 9

| ⅜ × ⅝ Gamma Irradiated Tubing | SS09-084, #5 Blend of 50% C-Flex - 046 and 50% Ultrathene | SS 10-005 Blend of 60% C-Flex -046 and 40% Ultrathene | C-Flex R70-374-000 |
|---|---|---|---|
| RF cycle sealing time | 46 seconds | 69 seconds | Cannot be RF sealed |
| Thermal cycle sealing time | | | 210 s |
| Sealing cycle time reduction | 78 | 67 | Reference |

SS09-084, #5 formulation based tubing is successfully seal tested for integrity. The SS10-005 tubing is able to be RF sealed in 69 seconds and the RF sealed samples are tested for seal integrity tests. The seals performed are both dry and wet (tubing filled with saline). The seal integrity results are as follows in Table 10.

TABLE 10

| Seal Integrity Testing at Northboro lab | C-Flex -374 (control) HEAT SEAL | SS 10-005 RF SEAL |
|---|---|---|
| Seal Integrity, saline filled gamma ⅜ × ⅝ tubing Burst test in a Carver press | | Tube & NOT seal area popped open, thus attesting to integrity and strength of the RF seal |

TABLE 10-continued

| Seal Integrity Testing at Northboro lab | C-Flex -374 (control) HEAT SEAL | SS 10-005 RF SEAL |
|---|---|---|
| Seal Integrity (Apply Pressure & Hold) | Failed within 5 minutes at 15 psi | Passed even at 45 psi |

In addition to aforementioned advantages of RF reactivity, C-Flex blended with EVA namely reduced tube sealing time with better tensile strength, the following improvements are expected and predicted based on the formulation characteristics: higher burst pressures based on better tensile strength as well as lower extractable (amount of such migrating substances as plasticizers, liquids, plastics additives which can be pulled out of the tubing formulation in to an extracting medium such as solvents and chemicals) than the control formulation of C-Flex-374. This is based on the fact that percent plasticizer used in RF reactive C-Flex SS09-084, #5 is half the amount used in -374 and thus should result in lower extractables in solvents such as hexane, isopropyl alcohol, and the like.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a bond comprising:
    providing a substrate having a first end and a second end, wherein the substrate includes a blend of at least two polymeric components and a plasticizer, the at least two polymeric components consisting essentially of an inert polymer and an elastomeric polar polymer, wherein the inert polymer has a dielectric factor of less than about 0.1; and
    bonding the first end and second end of the substrate with high frequency electromagnetic energy.

2. The method of claim 1, further comprising the step of sterilizing the substrate.

3. The method of claim 1, wherein the inert polymer includes a polyolefin.

4. The method of claim 1, wherein the inert polymer includes a thermoplastic elastomer (TPE).

5. The method of claim 4, wherein the thermoplastic elastomer includes styrene based block copolymers, thermoplastic olefin based elastomers, thermoplastic vulcanizates (TPV), thermoplastic polyester based elastomers, or mixtures thereof.

6. The method of claim 1, wherein the inert polymer includes a mixture of a polyolefin and a thermoplastic elastomer.

7. The method of claim 1, wherein the elastomeric polar polymer includes ethylene vinyl acetate.

8. The method of claim 7, wherein the ethylene vinyl acetate has a vinyl acetate content of greater than about 50% by weight of the total weight of the ethylene vinyl acetate.

9. The method of claim 7, wherein the ethylene vinyl acetate has a vinyl acetate content of less than 35% by weight of the total weight of the ethylene vinyl acetate.

10. The method of claim 1, further comprising the step of forming the blend into a single layer article or a multi-layer article.

11. The method of claim 1, further comprising the step of melt processing the blend by compounding.

12. The method of claim 1, further comprising the step of extruding or injection molding the blend.

13. The method of claim 1, wherein the elastomeric polar polymer is semi-crystalline or amorphous.

14. The method of claim 1, wherein the elastomeric polar polymer is present at a range of about 1% by weight to about 99% by weight of the total weight of the polymeric blend.

15. The method of claim 14, wherein the elastomeric polar polymer is present at greater than at least about 5% by weight of the total weight of the polymeric blend.

16. The method of claim 1, wherein the blend further includes fillers.

17. The method of claim 3, wherein the polyolefin includes polyethylene, polypropylene, polybutylene, polymethylpentene, olefin-based random copolymers, olefin-based impact copolymers, olefin-based block copolymers, olefin-based specialty elastomers, olefin-base specialty plastomers, or blends thereof.

18. The method of claim 1, wherein the blend has a shore A hardness of not greater than about 70.

* * * * *